(12) United States Patent
Jin et al.

(10) Patent No.: US 8,625,319 B2
(45) Date of Patent: Jan. 7, 2014

(54) BRIDGELESS PFC CIRCUIT FOR CRITICAL CONTINUOUS CURRENT MODE AND CONTROLLING METHOD THEREOF

(75) Inventors: Hongyuan Jin, Shanghai (CN); Hongjian Gan, Shanghai (CN)

(73) Assignee: Delta Electronics, Inc., Taoyuan Hsien (TW)

(*) Notice: Subject to any disclaimer, the term of this patent is extended or adjusted under 35 U.S.C. 154(b) by 398 days.

(21) Appl. No.: 12/757,150

(22) Filed: Apr. 9, 2010

(65) Prior Publication Data
US 2010/0259957 A1    Oct. 14, 2010

(30) Foreign Application Priority Data
Apr. 9, 2009 (TW) ................ 98111903 A

(51) Int. Cl.
*H02M 7/5387* (2007.01)

(52) U.S. Cl.
USPC ..................................... 363/132

(58) Field of Classification Search
USPC .......... 363/124–127, 132; 323/207, 222, 224, 323/299
See application file for complete search history.

(56) References Cited

U.S. PATENT DOCUMENTS

| | | | | |
|---|---|---|---|---|
| 5,654,880 A | * | 8/1997 | Brkovic et al. | 363/17 |
| 7,355,868 B2 | * | 4/2008 | Soldano | 363/89 |
| 7,605,570 B2 | * | 10/2009 | Liu et al. | 323/207 |
| 7,630,221 B2 | * | 12/2009 | Sui et al. | 363/70 |
| 2010/0259240 A1 | * | 10/2010 | Cuk | 323/299 |
| 2011/0013436 A1 | * | 1/2011 | Gan et al. | 363/126 |
| 2011/0149622 A1 | * | 6/2011 | Lin | 363/124 |

\* cited by examiner

*Primary Examiner* — Adolf Berhane
(74) *Attorney, Agent, or Firm* — Volpe and Koenig, P.C.

(57) ABSTRACT

The configurations of a bridgeless PFC circuit and a controlling method thereof are provided. The proposed circuit includes an AC power source, a first and a second bridge arms, each of which has a middle point, wherein the first terminal of the first bridge arm connects the first terminal of the second bridge arm, the second terminal of the first bridge arm connects the second terminal of the second bridge arm, and the middle point of the second bridge arm connects the second terminal of the AC power source, a bidirectional switch module connected to the two middle points, an inductor having a first terminal coupled to the AC power source and a second terminal coupled to the middle point of the first bridge arm and a sensing circuit magnetically coupled to the inductor.

20 Claims, 18 Drawing Sheets

BRIDGELESS PFC CIRCUIT FOR CRITICAL CONTINUOUS CURRENT MODE AND CONTROLLING METHOD THEREOF

FIELD OF THE INVENTION

The present invention relates to a bridgeless power factor correction (PFC) circuit for a critical continuous current mode and a controlling method thereof, which can be employed to solve the controlling problem of the critical CCM of the PFC circuit.

BACKGROUND OF THE INVENTION

In the conventional boost PFC circuits, the loss of rectifying bridge becomes one of the main losses of the switching power supply. Since the requirements on the power supply efficiency are more and more critical, the bridgeless boost topology deriving from the conventional boost PFC circuit has gradually become the focus of the R&D. The bridgeless boost omits the rectifying bridge in the front stage of the boost PFC circuit; decreases the loss of a diode; and increases the efficiency. And the H-bridge circuit belongs to one kind of bridgeless boost topologies suitable for the medium power and large power applications (please refer to FIG. 1). In FIG. 1, the bridgeless circuit receives the input voltage Vin, generates the output voltage Vo, and includes diodes D1-D4, switches Q1-Q2, inductor L and an output capacitor $C_B$. The bridgeless circuit can be used as a power factor correction (PFC) circuit.

In the applications for the medium and small power occasions, the conventional boost PFC topology as shown in FIG. 3 is widely applied due to its simple configuration, better stability and smaller switch stress. Under the critical continuous current mode (or continuous conductive mode, CCM), the current of the inductor L is decreased to zero before the switch S1 e.g. MOSFET is turned on. Since the current flowing through the rectifying diode (D6) is also zero, there is no reverse recovery loss of the rectifying diode, and the efficiency in this mode is high. The PFC circuit will adjust the amplitudes of the inductor current (the triangle waves in FIG. 2) to make the average current of the inductor (the average input current in FIG. 2) be a sinusoidal wave.

FIG. 3 shows the conventional boost PFC circuit and a method of sensing and measuring the voltage of the auxiliary winding $N_{AUX}$ of the boost inductor L is usually employed to judge the zero-crossing timing of the inductor current so as to realize the critical CCM controlling thereof. The polarity of the auxiliary winding is reversed to the polarity of the inductor. The voltage of the auxiliary winding is negative and is proportional to the amplitude of rectified AC voltage when the switch S1 is turned on. The voltage of the auxiliary winding is positive and is proportional to a difference between the output voltage and the rectified AC voltage amplitude when S1 is turned off. The output parasitic capacitance of S1 is resonant with the boost inductor when the inductor current reaches zero. Then the voltage of the auxiliary winding decreases due to the resonance. A signal for turning on S1 generates when the voltage of the auxiliary winding is lower than a threshold voltage (e.g. a voltage set up by the IC FAN7592) so as to realize the critical CCM controlling. This kind of method can be employed by many ICs, e.g., L6561, FAN7528, NCP1606, UCC38050 etc. In FIG. 3, the PFC circuit receives an input voltage Vin, generates an output voltage Vo, and includes diodes D1-D6, resistors R1-R6 and $R_{ZCD}$, switch S1, IC FAN7529 (having terminals MOT, COMP, GND, CS, INV, ZCD and $V_{CC}$), inductor L1, auxiliary winding $N_{AUX}$ and capacitors C1-C2 and Co, wherein GND is the grounded terminal.

FIGS. 4(a)-4(b) are schematic circuit diagrams showing the operating status of the H-bridge circuit during the positive half-cycle and the negative half-cycle of the input voltage Vin respectively. The elements included in FIGS. 4(a)-4(b) are the same as those of FIG. 1. L, D1, D4, Q1, Q2 and $C_B$ form a boost circuit when the input voltage is in its positive half-cycle. The current flows through L, Q1 and Q2 and then returns when Q1 turns on. While the current flows through L, D1, $C_B$, and D4 and then returns when Q1 turns off. L, D2, Q1, Q2, D3 and $C_B$ form another boost circuit when the input voltage is in its negative half-cycle. During the negative half-cycle, the current flows through L, Q1 and Q2 and then returns when Q2 turns on, while the current flows through L, D3, $C_B$ and D2 and then returns when Q2 turns off. The currents flow through L, Q1 and Q2 are in reverse directions when they are in the positive and the negative half-cycles. Due to that D3 and D4 clamp the AC power source Vin to the output capacitor $C_B$ of the boost circuit, the common mode noise, which is the same as the conventional boost PFC circuit, could be obtained. Since the current flows through only two semiconductor elements during a switch period, the conduction loss is decreased.

FIG. 5 is a schematic circuit diagram of an H-bridge circuit operating under the critical CCM via employing current transformers (CT). Except for a portion which is the same as that of FIG. 1, it further includes an RS flip-flop, a comparator, an error amplifier (EA) and two CTs CT1-CT2. Since the H-bridge circuit has different current loops during the positive and negative half-cycles of the input voltage, the two CTs CT1-CT2 must be used to sample the inductor current to turn on the switches when the inductor current is zero so as to realize the critical CCM controlling. The turn-off timing of the switches (Q1 or Q2) is determined by the ramp signal and the output signal Vcomp of the error amplifier EA.

FIG. 6 shows the waveforms of the controlling signals of the circuit as shown in FIG. 5, which includes the inductor current (signal), CT signal, the ramp signal, Q1 driving (signal) and Q2 driving (signal). Because the inductor current signal is sampled through the CT, its amplitude is varied according to the high/low of the input AC voltage and the light/heavy of the output load. The inductor current signal is easy to be interfered by the noise when the amplitude of inductor current is quite small such that the turn-on of the switch produces error implementation and the zero-current switching (ZCS) condition is lost. When the input voltage is quite high, the descending slope of the inductor current is smooth. And because the measuring threshold value is quite small, the switch is turned on before the inductor current decreases to zero, which will increase the turn-on loss.

Keeping the drawbacks of the prior arts in mind, and employing experiments and research full-heartily and persistently, the applicants finally conceived a bridgeless power factor correction circuit for a critical CCM and a controlling method thereof.

SUMMARY OF THE INVENTION

It is therefore an object of the present invention to provide a method for measuring an auxiliary winding of an inductor to realize the measurement of the zero-crossing of the inductor current so as to control the H-bridge circuit to work under the critical CCM. This controlling method does not require to measure the inductor current, could obtain the signal of the zero-crossing of the inductor current irrelevant to the AC input voltage and the output load, and causes the MOSFETs to be turned on accurately, the switching on loss to be decreased, no reverse recovery loss of the boost rectifying diode, and the higher efficiency.

According to the first aspect of the present invention, a bridgeless circuit includes an AC power source having a first and a second terminals, a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the second bridge arm connects the second terminal of the AC power source, a bidirectional switch module connected to the two middle points, an inductor having a first terminal connected to the first terminal of the AC power source and a second terminal connected to the middle point of the first bridge arm and a first auxiliary winding magnetically connected to the inductor.

Preferably, the bidirectional switch module comprises a first switch and a second switch connected to the first switch in series, each of the first and the second switches has a first and a second terminals, the first terminal of the first switch is connected to the middle point of the first bridge arm, the first terminal of the second switch is connected to the middle point of the second bridge arm, and the second terminal of the first switch is connected to the second terminal of the second switch.

Preferably, the circuit further comprises a second auxiliary winding, wherein the first auxiliary winding has a first and a second terminals generating a first sensing voltage on the first and the second terminals, and the second auxiliary winding is magnetically coupled to the inductor and has a first and a second terminals generating a second sensing voltage on the first and the second terminals of the second winding.

Preferably, the circuit further comprises a signal processing circuit generating an inductor current measuring signal through summing up the first and the second sensing voltages, wherein the inductor has an inductor current, and the inductor current measuring signal is a zero-crossing measuring signal of the inductor current and used to control the bidirectional switch module to turn on under zero current condition.

Preferably, the circuit further comprises an output capacitor having a first and a second terminals, wherein the first bridge arm has a first and a second diodes, the second bridge arm has a third and a fourth diodes, each of the diodes has an anode and a cathode, the cathode of the first diode connects the cathode of the third diode and the first terminal of the output capacitor, the anode of the first diode connects the cathode of the second diode to form the middle point of the first bridge arm, the anode of the third diode connects the cathode of the fourth diode to form the middle point of the second bridge arm, and the anode of the fourth diode connects the anode of the second diode and the second terminal of the output capacitor.

Preferably, the bidirectional switch module receives a driving signal, the first and the second auxiliary windings have a second terminal; both of the second terminals of the first and the second auxiliary windings are grounded; the first auxiliary winding and the second auxiliary winging are reverse coupled with the inductor, and the signal processing circuit further comprises a first resistor having a first terminal connected to the first terminal of the first auxiliary winding, and a second terminal, a second resistor having a first terminal connected to the first terminal of the second auxiliary winding, and a second terminal, a first capacitor having a first terminal connected to the second terminal of the first resistor, and a second terminal grounded, a second capacitor having a first terminal connected to the second terminal of the second resistor, and a second terminal grounded, a first diode having an anode connected to the first terminal of the first capacitor, and a cathode, a second diode having an anode connected to the first terminal of the second capacitor, and a cathode, a third resistor having a first terminal connected to the cathodes of the first and the second diodes and outputting the inductor current measuring signal, and a second terminal connected to the second terminal of the second capacitor, a third switch having a first terminal connected to the first terminal of the third resistor, a second terminal grounded and a control terminal, and a delaying circuit receiving the driving signal and outputting a delayed driving signal to the control terminal of the third switch.

Preferably, a fourth resistor having a first terminal connected to the control terminal of the third switch, and a second terminal, a third capacitor having a first terminal connected to the first terminal of the fourth resistor, and a second terminal connected to the second terminal of the fourth resistor and grounded and a third diode having an anode receiving the driving signal, and a cathode connected to the first terminal of the third capacitor.

Preferably, the bridgeless circuit is an H-bridge circuit, and the bidirectional switch module is turned on when the inductor current measuring signal has a predetermined value.

Preferably, the circuit further comprises a control circuit comprising an error amplifier receiving a reference voltage and an output voltage feedback signal generated by the bridgeless circuit, and generating a first output signal, a comparator receiving the first output signal and a ramp signal, and generating a second output signal and a flip-flop having a first input terminal receiving the inductor current measuring signal, a second input terminal receiving the second output signal and an output terminal generating a driving signal driving the bidirectional switch module.

Preferably, the flip-flop is an RS flip-flop.

According to the second aspect of the present invention, a bridgeless circuit includes an AC power source having a first and a second terminals, a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the second bridge arm connects the second terminal of the AC power source, a bidirectional switch module connected to the two middle points, an inductor having a first terminal connected to the first terminal of the AC power source and a second terminal connected to the middle point of the first bridge arm, a sensing circuit magnetically coupled to the inductor for generating a sensing voltage, and a signal processing circuit processing the sensing voltage and generating an inductor current measuring signal so as to control the bidirectional switch module.

Preferably, the inductor current measuring signal is a zero-crossing measuring signal of the inductor current.

Preferably, the sensing circuit is an auxiliary winding coupled with the inductor for generating the sensing voltage.

Preferably, the circuit further comprises an output capacitor having a first and a second terminals, wherein the first bridge arm has a first and a second diodes, the second bridge arm has a third and a fourth diodes, each of the diodes has an anode and a cathode, the cathode of the first diode connects the cathode of the third diode and the first terminal of the output capacitor, the anode of the first diode connects the cathode of the second diode to form the middle point of the first bridge arm, the anode of the third diode connects the cathode of the fourth diode to form the middle point of the second bridge arm, and the anode of the fourth diode connects the anode of the second diode and the second terminal of the output capacitor.

Preferably, the bidirectional switch module comprises a first switch and a second switch connected to the first switch in series and receives a driving signal, each of the first and the second switches has a first and a second terminals, the first terminal of the first switch is connected to the middle point of the first bridge arm, the first terminal of the second switch is connected to the middle point of the second bridge arm, the second terminal of the first switch is connected to the second terminal of the second switch, the auxiliary winding has a first and a second terminals, the auxiliary winding is reverse coupled with the inductor, and the sensing circuit further comprises a first resistor having a first terminal connected to the first terminal of the auxiliary winding, and a second terminal, a second resistor having a first terminal connected to the second terminal of the auxiliary winding, and a second terminal, a fifth diode having an anode connected to the second terminal of the first resistor and a cathode, a sixth diode having an anode connected to the second terminal of the second resistor and a cathode, a third resistor having a first terminal connected to the cathodes of the fifth and the sixth diodes and outputting the inductor current measuring signal, and a second terminal, a third switch having a first terminal connected to the anode of the sixth diode, a second terminal connected to the second terminal of the third resistor and a control terminal and a fourth switch having a first terminal connected to the anode of the fifth diode, a second terminal connected to the second terminal of the third switch and the second terminal of the third resistor, and a control terminal.

Preferably, the circuit further comprises a control circuit comprising an error amplifier receiving a reference voltage and an output voltage feedback signal generated by the bridgeless circuit, and generating a first output signal, a comparator receiving the first output signal and a ramp signal, and generating a second output signal and a flip-flop having a first input terminal receiving the inductor current measuring signal, a second input terminal receiving the second output signal and an output terminal generating a driving signal driving the bidirectional switch module.

According to the third aspect of the present invention, a controlling method for a bridgeless circuit, wherein the circuit comprises a bidirectional switch module, an inductor, and a first and a second auxiliary windings coupled to the inductor, comprises steps of: causing the first auxiliary winding to generate a first sensing voltage; causing the second auxiliary winding to generate a second sensing voltage; using the first and the second sensing voltages to generate an inductor current measuring signal; and turning on the bidirectional switch module when the inductor current measuring signal reaches a predetermined value.

Preferably, the controlling method for a bridgeless circuit, wherein the circuit comprises a bidirectional switch module, an inductor, and a first and a second auxiliary windings coupled to the inductor, comprises steps of: causing the first auxiliary winding to generate a first sensing voltage; causing the second auxiliary winding to generate a second sensing voltage; using the first and the second sensing voltages to generate an inductor current measuring signal; and turning on the bidirectional switch module when the inductor current measuring signal reaches a predetermined value, wherein the first auxiliary winding has a first polarity reversed to a first polarity of the inductor, and the second auxiliary winding has a first polarity reversed to the first polarity of the inductor.

According to the fourth aspect of the present invention, a controlling method for a bridgeless circuit, wherein the circuit comprises a bidirectional switch module, an inductor and an auxiliary winding coupled to the inductor, comprises steps of: causing the auxiliary winding to generate a sensing voltage; using the sensing voltage to generate an inductor current measuring signal; and turning on the bidirectional switch module when the inductor current measuring signal has a predetermined value.

Preferably, the controlling method for a bridgeless circuit, wherein the circuit comprises a bidirectional switch module, an inductor and an auxiliary winding coupled to the inductor, comprises steps of: causing the auxiliary winding to generate a sensing voltage; using the sensing voltage to generate an inductor current measuring signal; and turning on the bidirectional switch module when the inductor current measuring signal has a predetermined value, wherein the auxiliary winding has a first polarity reversed to a first polarity of the inductor.

The present invention may best be understood through the following descriptions with reference to the accompanying drawings, in which:

DETAILED DESCRIPTION OF THE PREFERRED EMBODIMENT

Figure 1:
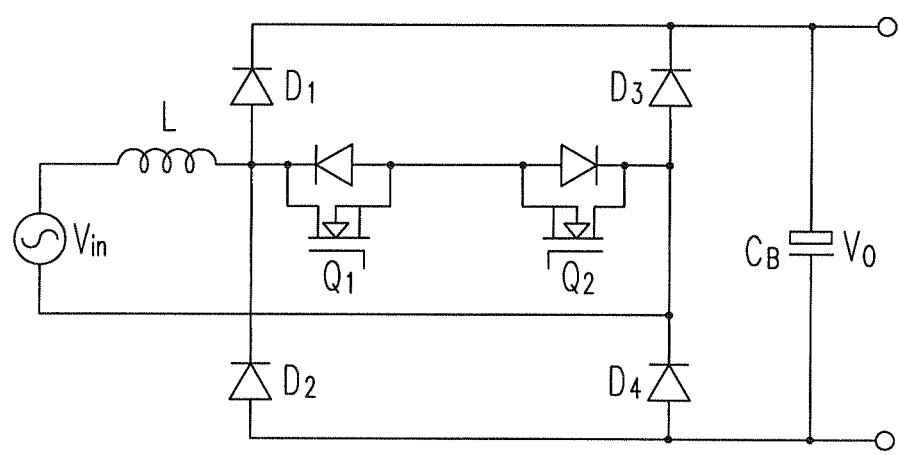
FIG. 1 shows a circuit diagram of an H-bridge circuit in the prior art.
Figure 2:
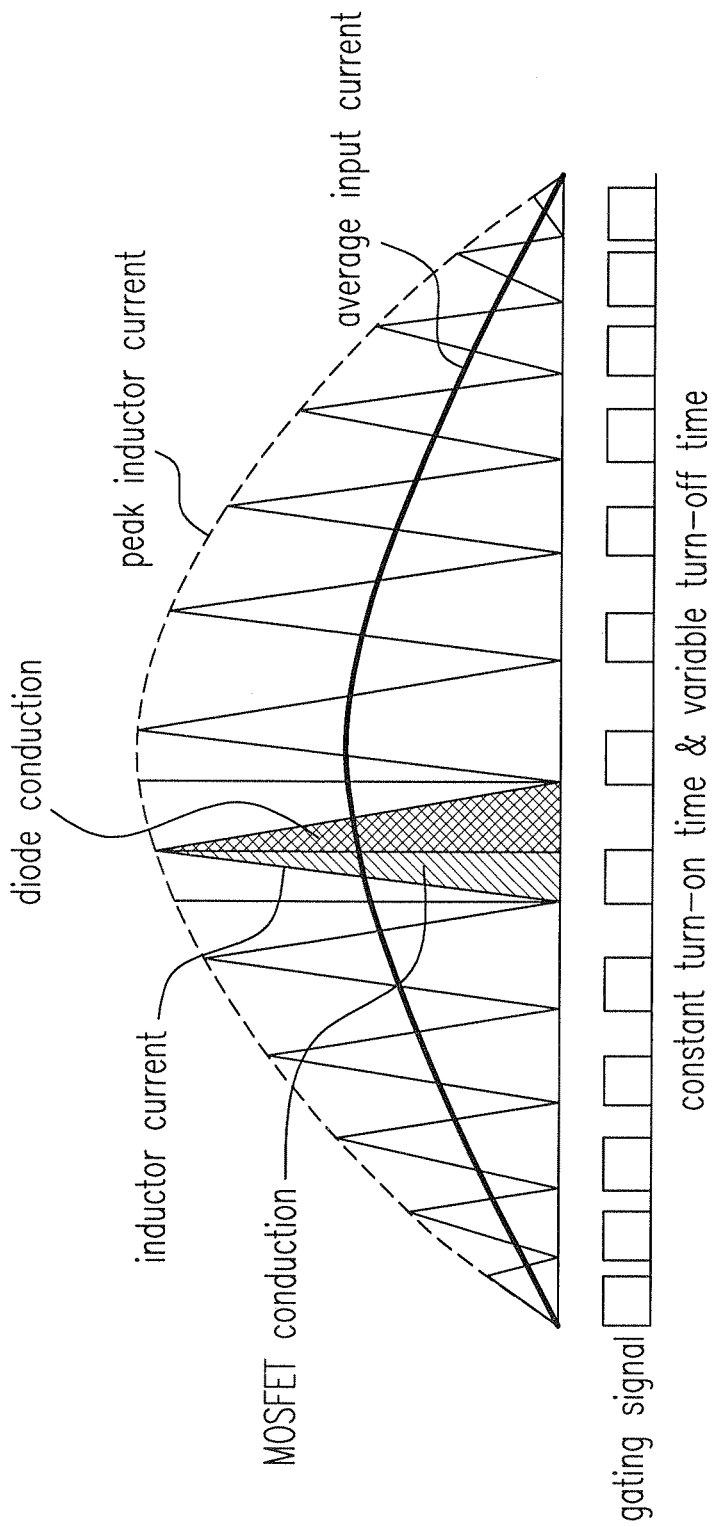
FIG. 2 shows a waveform diagram of the inductor current operating under the critical CCM.
Figure 3:
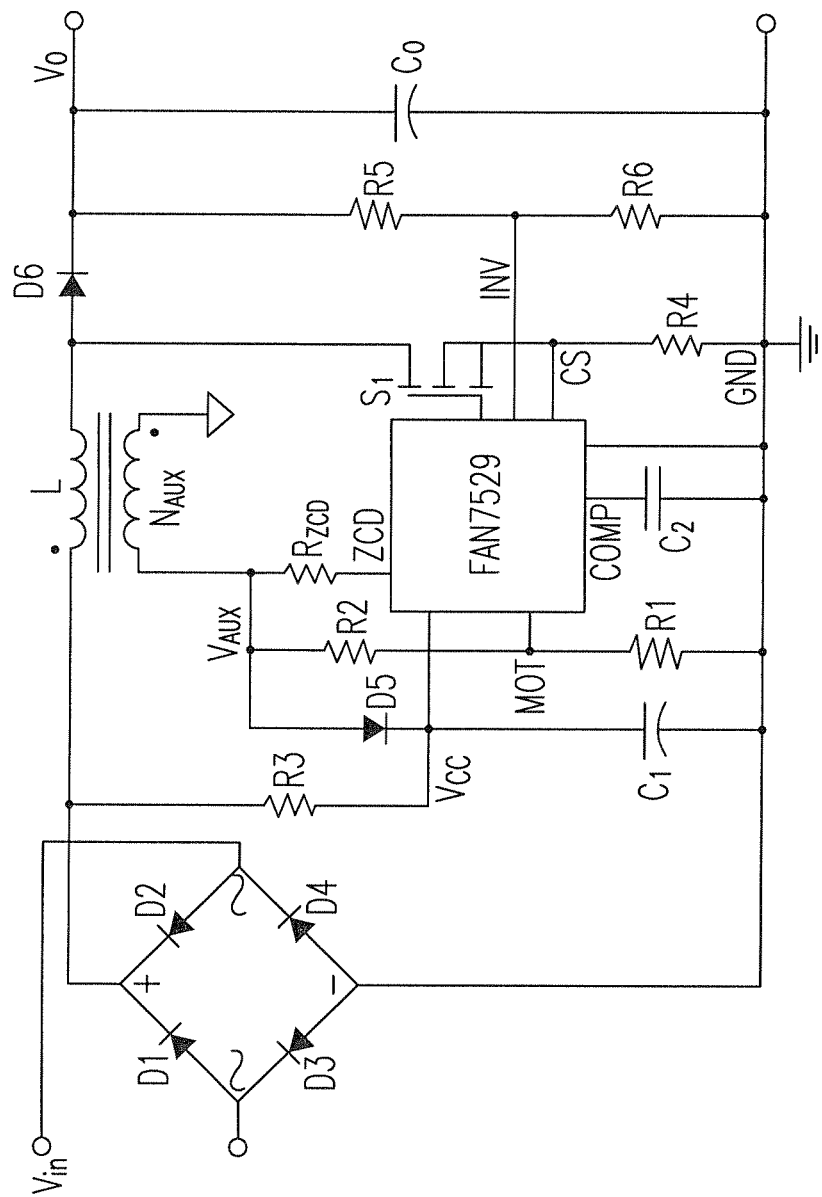
FIG. 3 shows a schematic circuit diagram of a conventional boost PFC circuit realizing the critical CCM controlling through measuring the voltage of the auxiliary winding of the boost inductor.
Figure 4A:
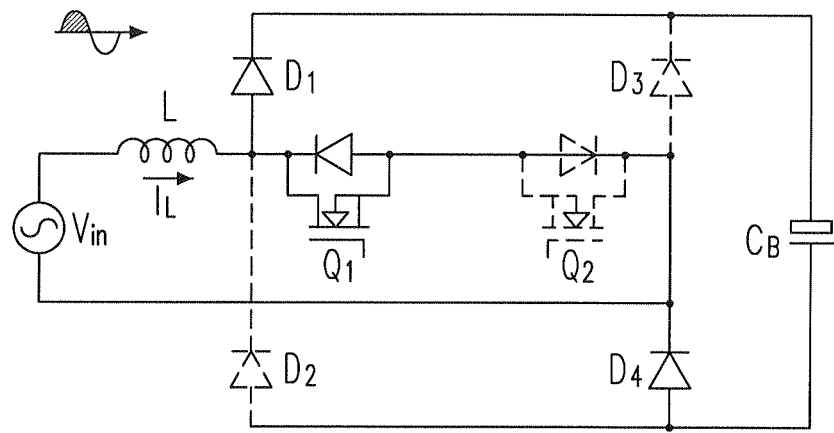
FIGS. 4(a)-4(b) are schematic circuit diagrams showing the operational statuses of the positive half-cycle and the negative half-cycle of a period of operational frequency of the conventional H-bridge circuit respectively.
Figure 4B:
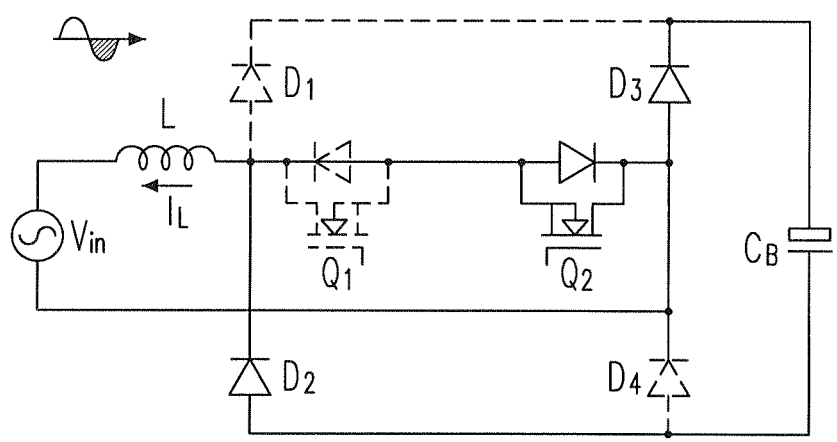
Figure 5:
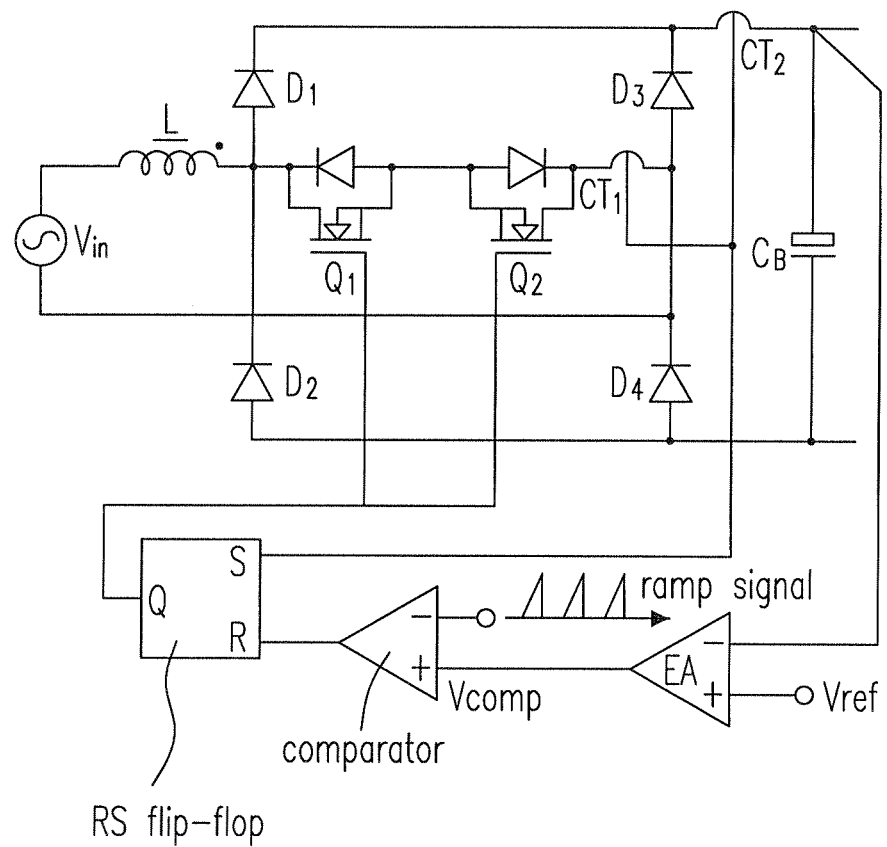
FIG. 5 shows a schematic circuit diagram of a conventional H-bridge circuit realizing the critical CCM controlling via employing a CT.
Figure 6:
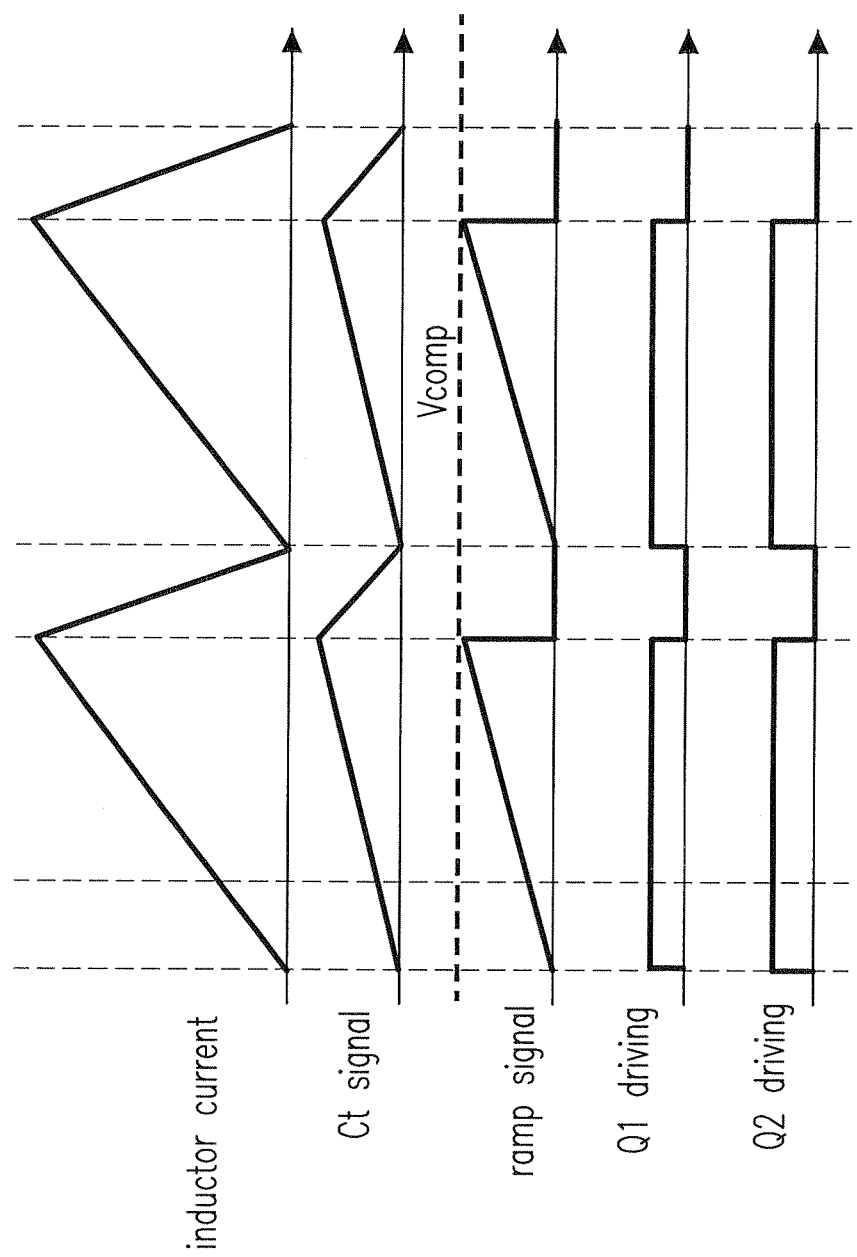
FIG. 6 shows an operational waveform diagram of the circuit as shown in FIG. 5.
Figure 7:
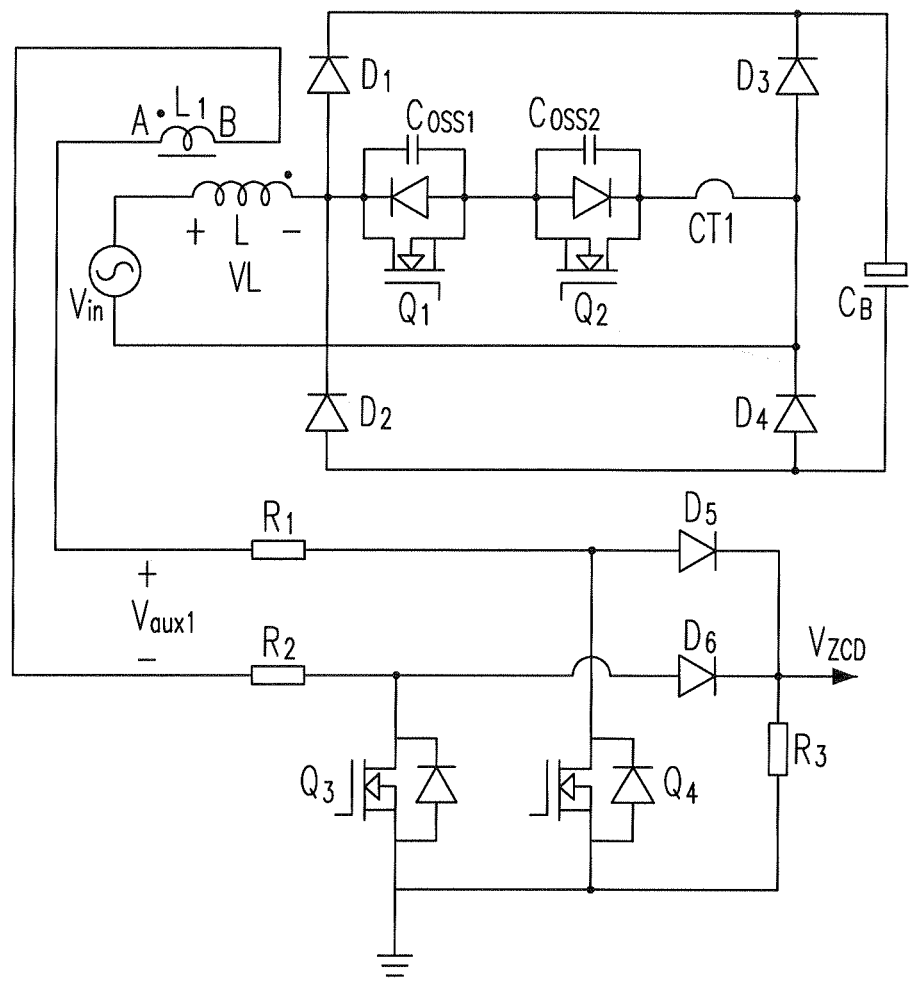
FIG. 7 shows a schematic circuit diagram of an H-bridge circuit employing an auxiliary winding to realize the critical CCM controlling according to the first preferred embodiment of the present invention.

FIG. 7 shows a schematic circuit diagram of an H-bridge circuit employing an auxiliary winding to realize the critical CCM controlling according to the first preferred embodiment of the present invention. A sensing circuit comprises the auxiliary winding L1 of the inductor L reverse coupled with the inductor L, which generates a sensing voltage Vaux1. Since L1 is reverse coupled with L, the voltage sensed by the auxiliary winding L1, Vaux1, has an opposite polarity with the voltage of the inductor L, $V_L$. A signal processing circuit comprises resistors R1, R2 and R3, diodes D5 and D6, switches Q3 and Q4. And the signal processing circuit receives the sensing voltage and generating an inductor current measuring signal so as to control the switch Q1 and Q2. In the positive half-cycle of the input voltage Vin, Q3 is on, which allows the terminal B of the auxiliary winding L1 being grounded via R2 and Q3. In the negative half-cycle of the input voltage, Q4 is on, which allows the terminal A of the auxiliary winding L1 being grounded via R1 and Q4. The measuring signal $V_{ZCD}$ is sent into a control circuit e.g. an IC (e.g., any of the ZCD terminals of L6561, FAN7528, NCP1606, UCC38050 etc, which is not shown in FIG. 7, and please refer to FIG. 3) or the set terminal of the RS flip-flop shown in FIG. 5 to make the switches Q1 and Q2 turn on under the zero current condition.

Figure 8:
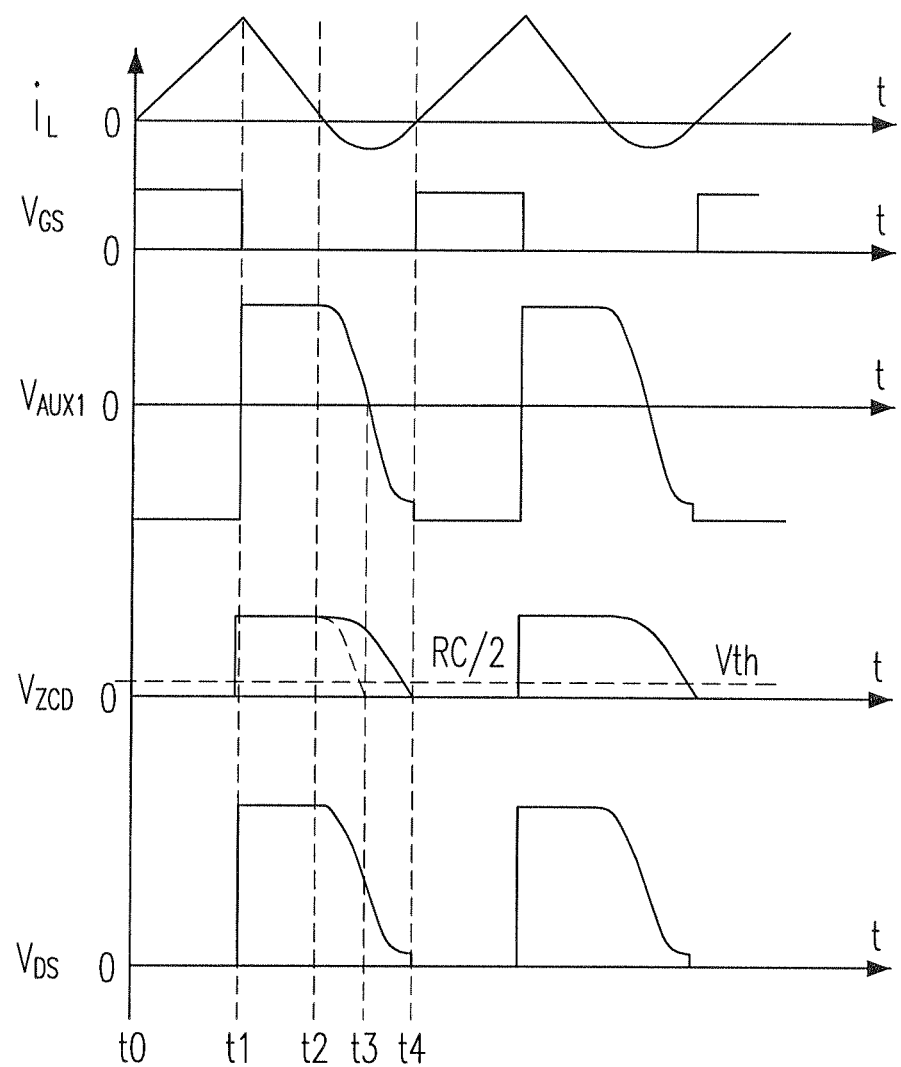
FIG. 8 is the waveforms of the circuit shown in FIG. 7.

FIG. 8 is the waveforms of the circuit shown in FIG. 7. In FIG. 8, $i_L$ is the current on the inductor L; $V_{GS}$ is the gate driving signal of the switches Q1 and Q2; $V_{AUX1}$ is the voltage of the auxiliary winding L1; $V_{ZCD}$ is a zero-crossing measuring signal of the inductor current; and $V_{DS}$ is the voltage between the drain and the source of the MOSFET Q1.

FIGS. 9(a)-9(d) show the switches' statuses and the currents' flowing directions of four different stages when the input voltage is in the positive half-cycle as shown in FIG. 8 according to the circuit shown in FIG. 7. The analyses of the stages of the circuit when the input voltage is in the negative half-cycle are the similar to those of the stages of the circuit when the input voltage is in the positive half-cycle. And during the positive half-cycle, Q3 is constantly on.

Figure 9A:
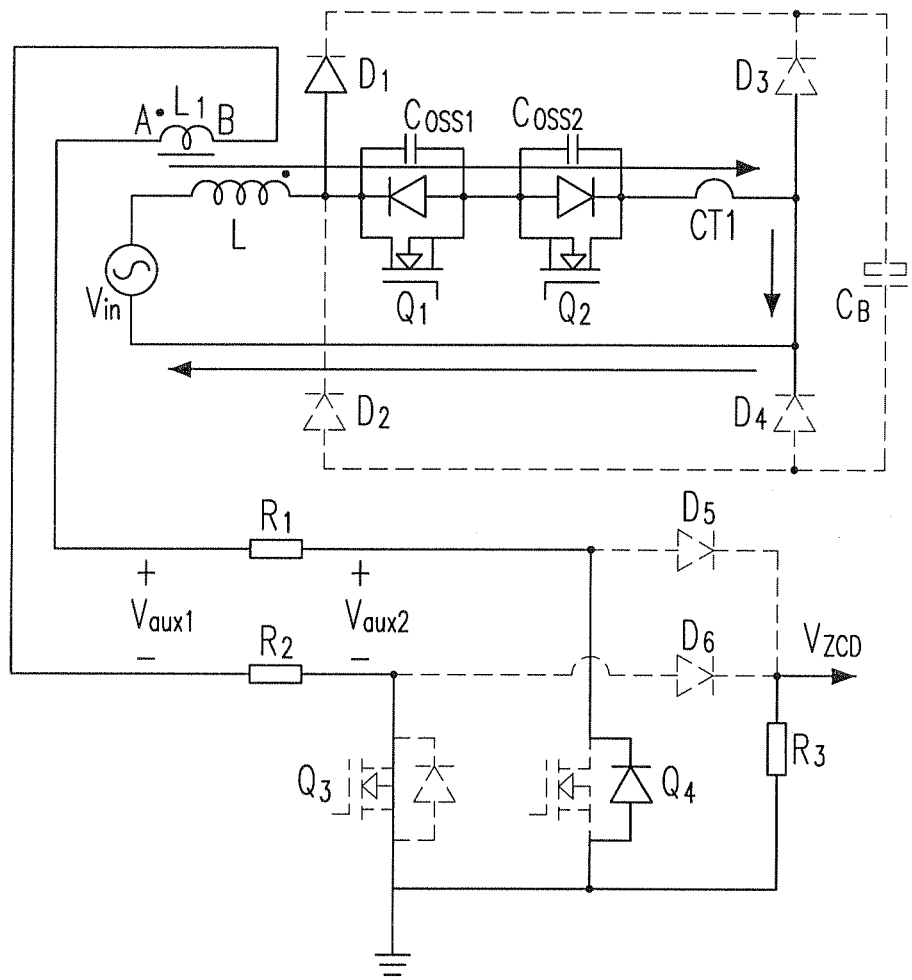
FIGS. 9(a)-9(d) respectively show the switches' statuses and the currents' flowing directions of four different stages when the input voltage is in the positive half-cycle as shown in FIG. 8 according to the circuit shown in FIG. 7.

FIG. 9(a) shows the first stage of the circuit in FIG. 7; and the corresponding waveforms are shown in the t0-t1 stage of FIG. 8. Two MOSFETs Q1 and Q2 are turned on simultaneously, thus the current flows through L, Q1 and Q2. During this stage, the inductor current is linearly increased from 0. The voltage on the inductor L is Vin, the sensed voltage Vaux1 of the auxiliary winding L1 is −nVin (n is the turns ratio of the auxiliary winding L1 and the inductor L). Since Vaux1 is a negative voltage, the parasitic diode of Q4, R2 and R1 form a loop via Q3; diodes D5 and D6 are turned off since Vaux2=0, and since $V_{ZCD}$ connects GND only through R3, thus $V_{ZCD}$=0. And the duration of this interval (t0-t1) is $$t_{M1} = \frac{2P_{OUT}L}{\eta V_{in}^2},$$

wherein $P_{OUT}$ is the output power, Vin is the AC input voltage, L is the inductance of the inductor L, and η is the efficiency of the main circuit.

Figure 9B:
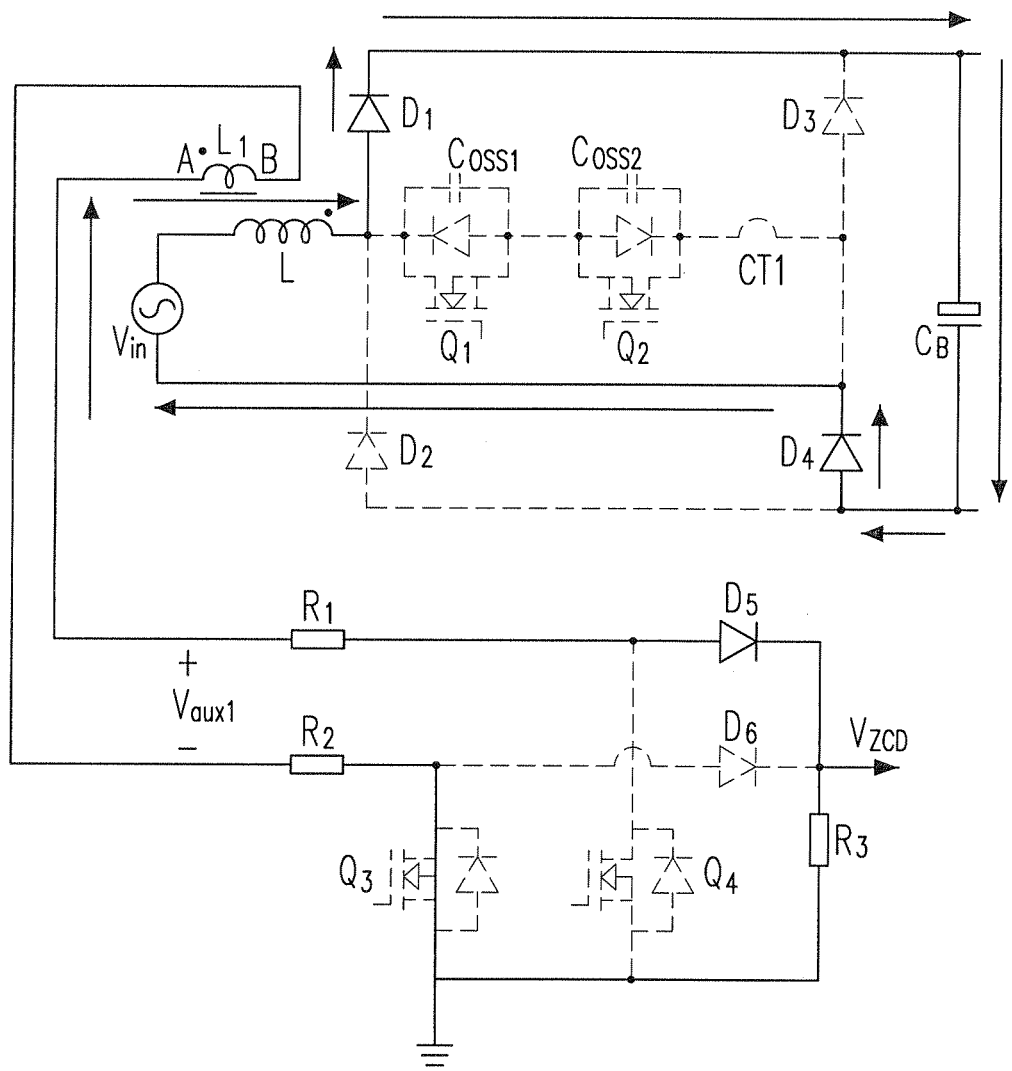

FIG. 9(b) shows the second stage of the circuit in FIG. 7; the corresponding waveforms are shown in the t1-t2 stage of FIG. 8. During t1-t2, the two MOSFETs Q1 and Q2 are turned off simultaneously; and the current flows through L, D1, $C_B$ and D4. During this interval, the inductor voltage is $V_{out}$ (the voltage on $C_B$) −$V_{in}$, and the inductor current is linearly decreased to zero. The sensed voltage Vaux1 of the auxiliary winding L1 is n($V_{out}$−$V_{in}$). Since Vaux1 is a positive voltage, Q3, R2, L1, R1, D5 and R3 form a loop; Q4 and D6 are turned off; and $$V_{ZCD} = \frac{R_3}{R_1 + R_2 + R_3} V_{aux1}.$$

Figure 9C:
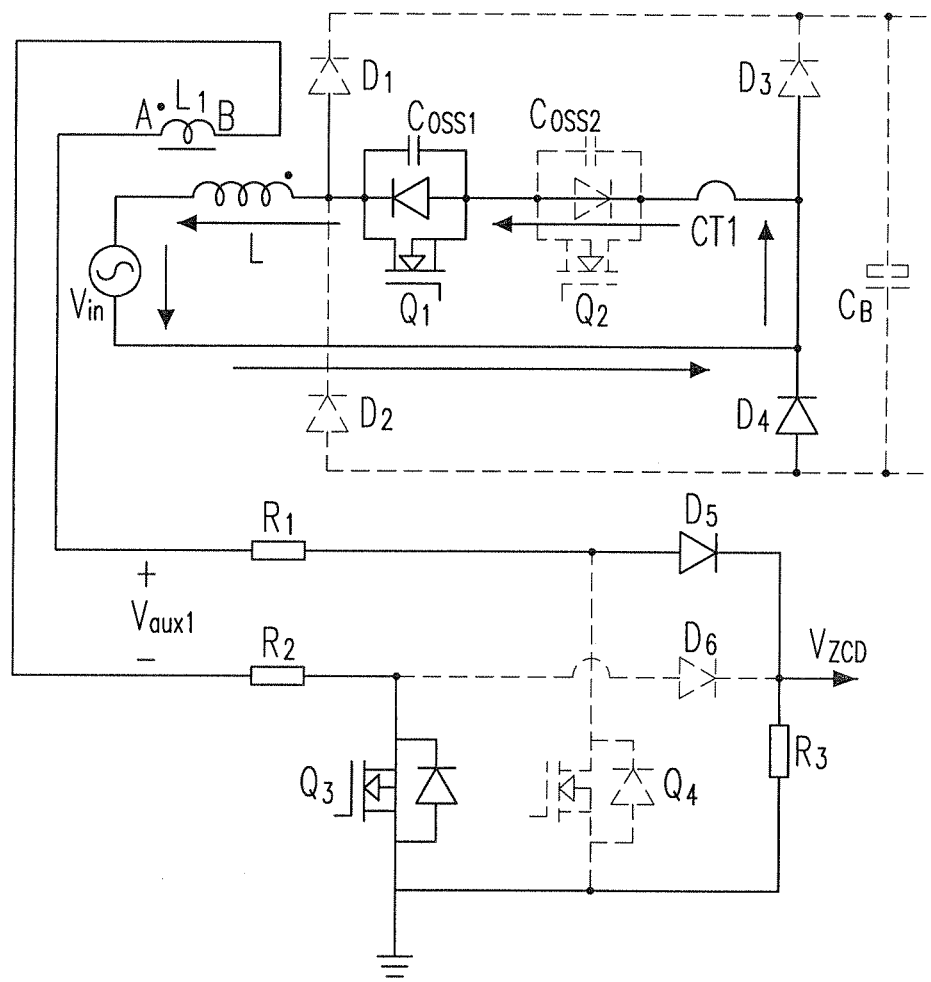

FIG. 9(c) shows the third stage of the circuit in FIG. 7. And the corresponding waveforms are shown in the t2-t3 stage of FIG. 8. The rectifying diodes D1 and D4 are turned off naturally after the current of the inductor L decreases to zero, and there is no generation of the reverse recovery current. The parasitic capacitor $C_{OSS1}$ of Q1 discharges and is resonant with the inductor L through Vin (the parasitic capacitor of Q2 is $C_{OSS2}$). The sensed voltage Vaux1 is resonantly decreased at that stage, and Vaux1 reaches a predetermined value at the end of that stage—the timing t3. Since Vaux1 is a positive voltage, Q3, R2, L1, R1, D5 and R3 form a loop, and Q4 and D6 are turned off. Due to the existing of the measuring terminal capacitor (the capacitor connected between $V_{ZCD}$ and ground which is not shown in FIG. 9(c) and the capacitor may be a parasitic capacitor), the voltage value of the measuring signal $V_{ZCD}$ is still larger than the threshold Vth required by conducting the MOSFETs Q1 and Q2.

Figure 9D:
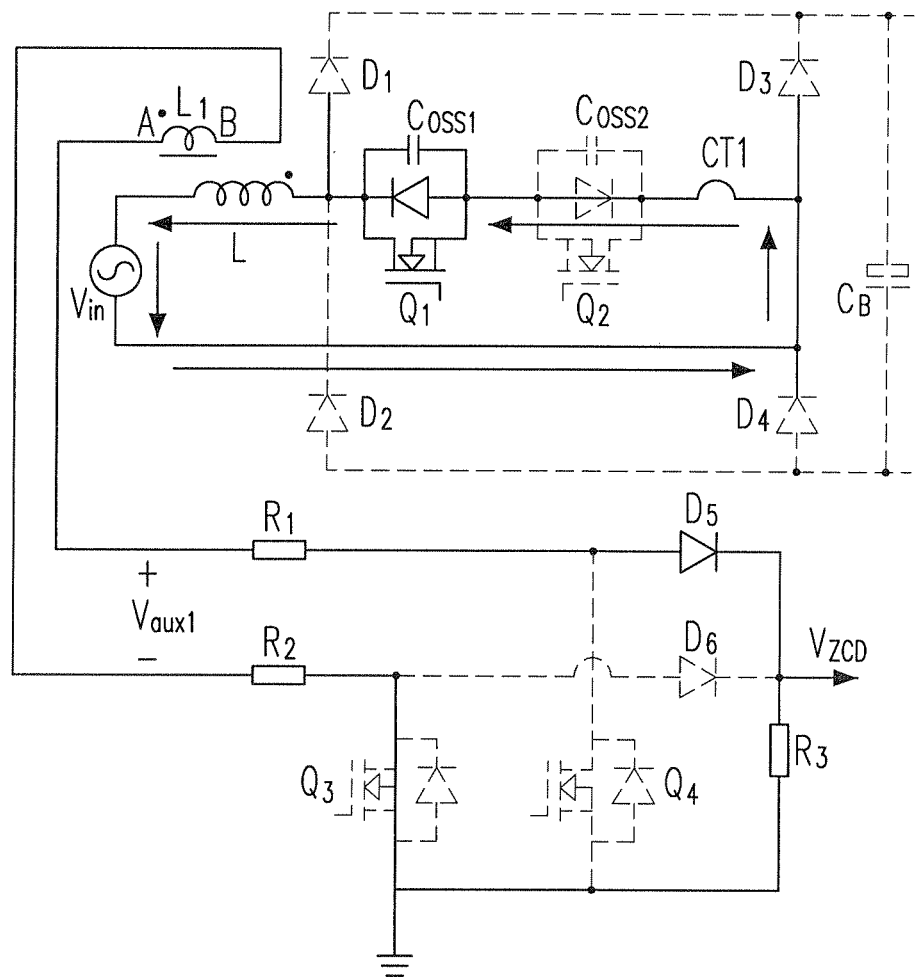

FIG. 9(d) shows the fourth stage of the circuit in FIG. 7; the corresponding waveforms are shown in the t3-t4 stage of FIG. 8. The parasitic capacitor $C_{OSS1}$ of Q1 is resonant with the inductor L through Vin continuously. The current path is the same as the previous stage. The sensed voltage Vaux1 of the auxiliary winding L1 becomes a negative value, the voltage value is lower than the measuring threshold value required by turning-on the MOSFETs Q1 and Q2. After a delay time of RC/2 (wherein R is the resistance value of the resistors R3, and C is the capacitance value of the portion of $V_{ZCD}$), the MOSFETs Q1 and Q2 are turned on, and the four stages of the positive half-cycle are ended.

In the circuit of FIG. 7, the sensed signal obtained via the voltages on the auxiliary winding of the inductor has a higher noise margin such that the MOSFET implementations are accurate and the turn-on losses are decreased. Besides, comparing with the signal obtained by using the two CTs in FIG. 5, the signal obtained by the circuit in FIG. 7 has a stable amplitude value, and is irrelevant to the load. However, in FIG. 7, the gate driving signals of Q3 and Q4 are derived from the measurements of the phase of the input voltage so that the complexity of the circuit is thus increased.

Figure 10:
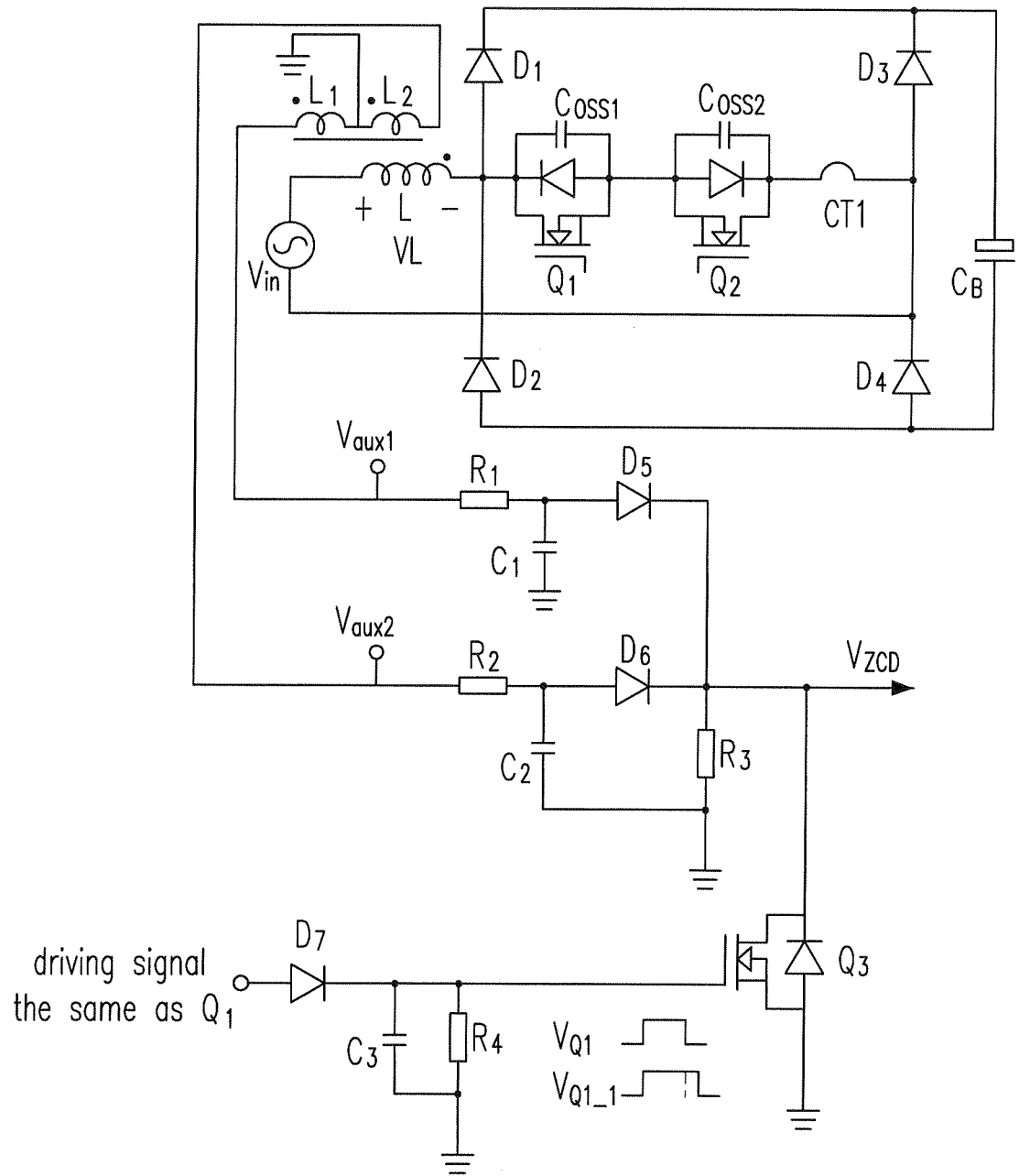
FIG. 10 shows a schematic circuit diagram of an H-bridge circuit employing two auxiliary windings to realize the critical CCM controlling according to the second preferred embodiment of the present invention.

FIG. 10 shows a schematic circuit diagram of an H-bridge circuit employing two auxiliary windings L1 and L2 of the inductor L to realize the critical CCM control according to the second preferred embodiment of the present invention. In FIG. 10, the sensing circuit comprises two auxiliary windings L1 and L2 reverse coupled with the inductor L which generates two sensing voltages—Vaux1 sensed by the auxiliary winding L1 and Vaux2 sensed by the auxiliary winding L2. The signal processing circuit comprises two identical networks formed by resistors R1, capacitor C1 and resistor R2, capacitor C2, and two diodes D5 and D6. Vaux1 and Vaux2 are respectively filtered by the two networks, and then are combined or summed up through the two diodes D5 and D6 to generate the measuring signal $V_{ZCD}$ on R3 and Q3. And a delaying circuit comprising D7, C3 and R4 receives a driving signal of Q1, $V_{Q1}$, and generates a delayed control signal $V_{Q1-1}$ to control Q3. The delayed signal has almost the same rising edge with the driving signal of Q1 while its falling edge falls behind that of the driving signal of Q2. Comparing with the aforementioned first preferred embodiment, the second preferred embodiment does not require measuring the phase of the input voltage. Thus the electronic circuit is simpler.

Figure 11:
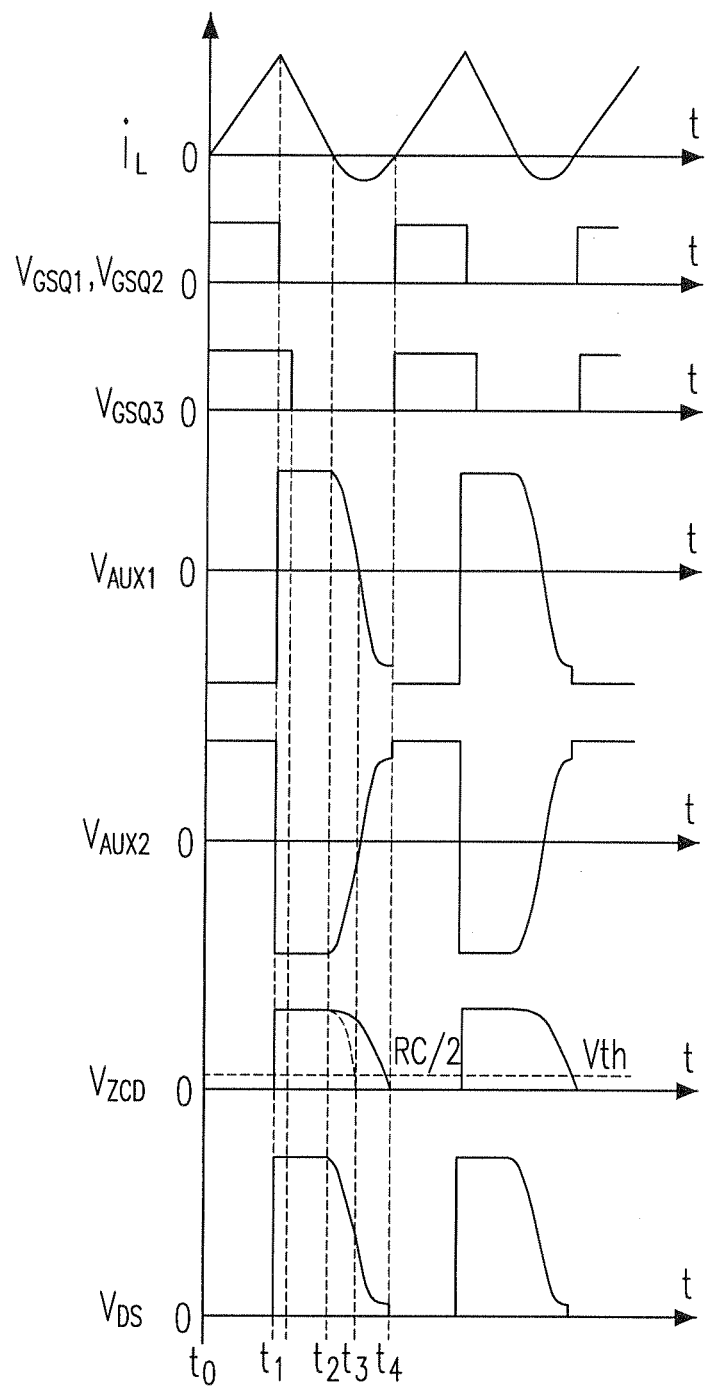
FIG. 11 shows waveforms of the circuit in FIG. 10.

FIG. 11 shows the waveforms of the circuit in FIG. 10. In FIG. 11, $i_L$ is the current on the inductor L. $V_{GS}Q1$, $V_{GS}Q2$ and $V_{GS}Q3$ are the gate driving signals of switches e.g. MOSFETs Q1, Q2 and Q3. $V_{AUX1}$ is the voltage of the auxiliary winding L1; $V_{AUX2}$ is the voltage of the auxiliary winding L2. $V_{ZCD}$ is a zero-crossing measuring signal of the inductor current, and $V_{DS}$ is the voltage between the drain and the source of the MOSFET Q1.

FIGS. 12(a)-12(d) show the switches' statuses and the currents' flowing directions of four different stages when the input voltage is in the positive half-cycle as shown in FIG. 11 according to the circuit as shown in FIG. 10. The analyses of the stages of the circuit when the input voltage is in the negative half-cycle correspond to those of the stages of the circuit when the input voltage is in the positive half-cycle.

Figure 12A:
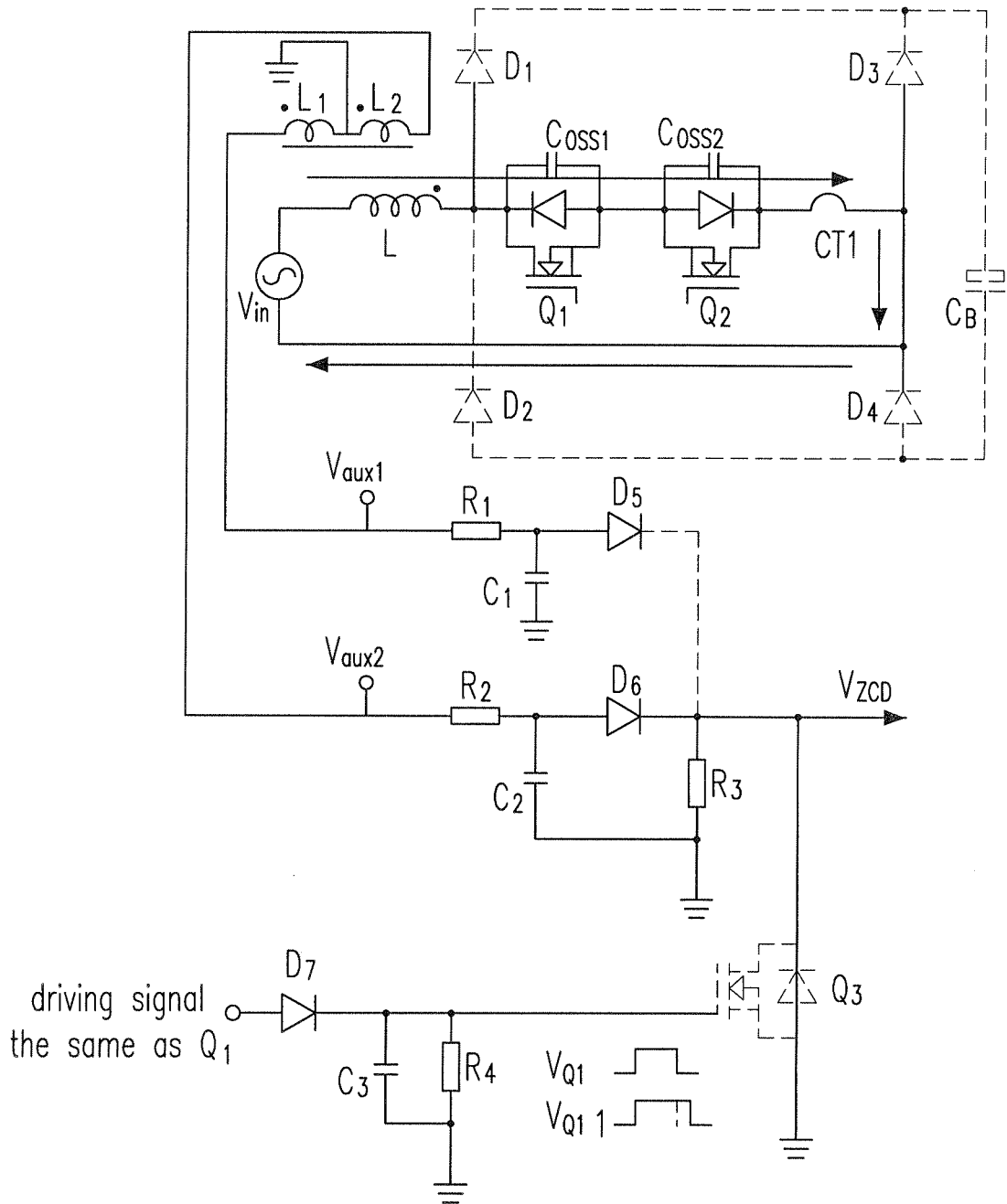
FIGS. 12(a)-12(d) respectively show the switches' statuses and the currents' flowing directions of four different stages when the input voltage is in the positive half-cycle as shown in FIG. 11 according to the circuit as shown in FIG. 10.

FIG. 12(a) shows the first stage of the circuit in FIG. 10. The corresponding waveforms are shown in the t0-t1 stage of FIG. 11. During t0-t1 stage, two MOSFETs Q1 and Q2 are turned on simultaneously, and the current flows through L, Q1 and Q2, and then returns to Vin. During this period, the inductor current is linearly increased from 0. The voltage on the inductor L is Vin (the input voltage), then the sensed voltage Vaux1 of the auxiliary winding L1 is –nVin and the sensed voltage Vaux2 of the auxiliary winding L2 is nVin (the turns ratio of the auxiliary winding L1 and the inductor L is n, and the turns ratio of the auxiliary winding L2 and the inductor L is also n). At this time, the driving signals of Q1 and Q2 are the same, Q3 is continuously on, and the value of the zero-crossing measuring signal $V_{ZCD}$ is 0V. And the duration of this period t0-t1 is $$t_{M1} = \frac{2P_{OUT}L}{\eta V_{ac}^2}.$$

Figure 12B:
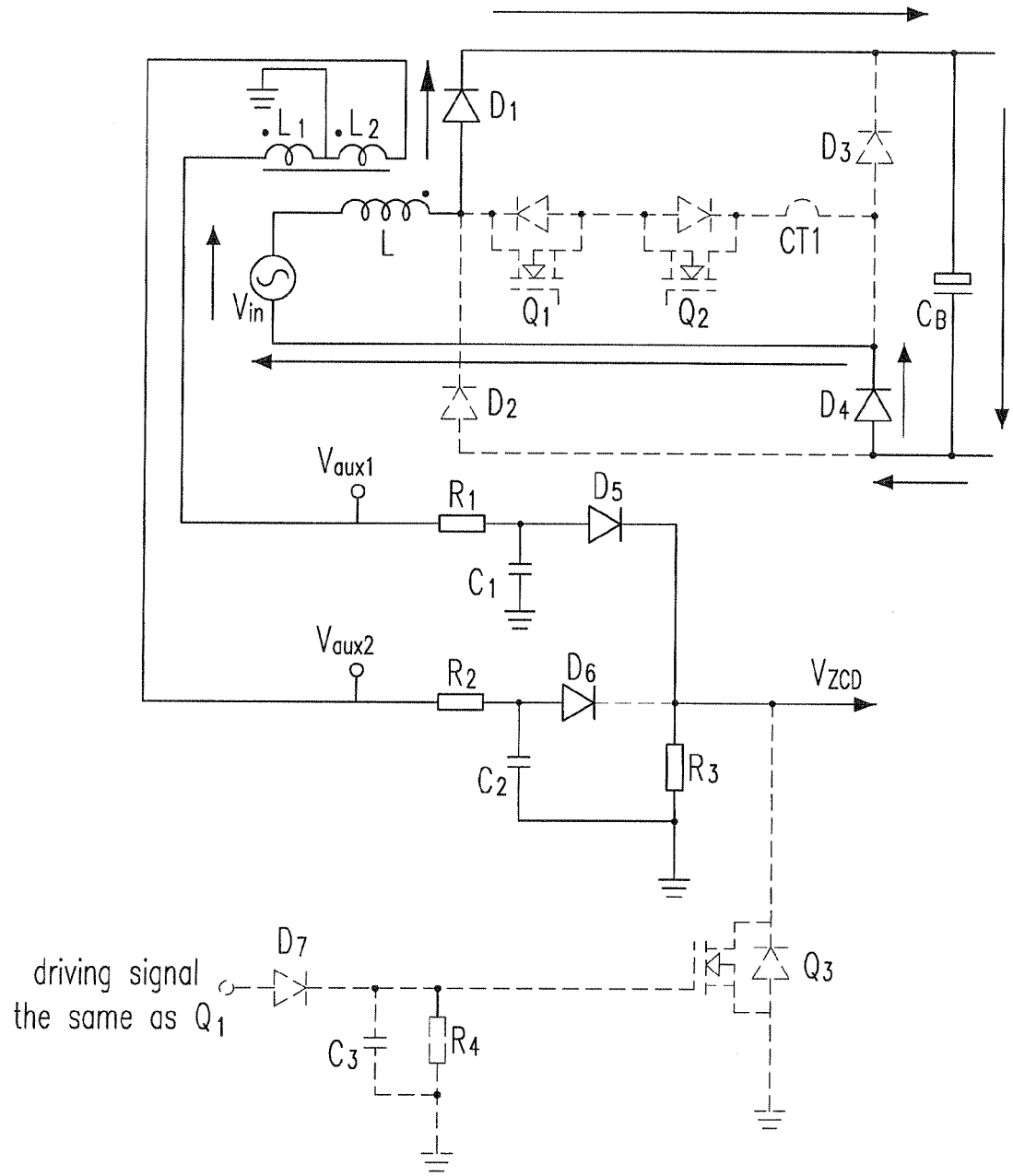

FIG. 12(b) shows the second stage of the circuit in FIG. 10, the corresponding waveforms are shown in the t1-t2 stage of FIG. 11. After the two MOSFETs Q1 and Q2 are turned off simultaneously, the current flows through L, D1, $C_B$ and D4, and then returns to the input voltage Vin. During this period, the inductor voltage is $V_{out}$ (the output voltage on $C_B$) –$V_{in}$, and the inductor current is linearly decreased to zero. The sensed voltage Vaux1 of the auxiliary winding L1 is n($V_{out}$–$V_{in}$). The sensed voltage Vaux2 of the auxiliary winding L2 is –n($V_{out}$–$V_{in}$). When the MOSFETs Q1 and Q2 are turned off, Vaux1 changes from a negative voltage to a positive voltage and Vaux2 changes from a positive voltage to a negative voltage. And a delay time for driving Q3 is added to avoid the influence to the signal measurement of $V_{ZCD}$ at this time (as shown in FIGS. 10 and 12(a), VQ1 is the gate driving signal of Q1 and VQ1_1 is the gate driving signal of Q3. VQ1_1 is obtained after VQ1 passes through the delaying circuit formed by D7, C3 and R4.). After Q3 is turned off, the zero-crossing measuring signal $V_{ZCD}$ is determined by Vaux1 due the existence of D5. And the period t2-t1 is $$t_{M2} = \frac{i_{PEAK}}{V_{out} - V_{in}} L,$$

wherein $i_{PEAK}$ is the peak value of the inductor current.

Figure 12C:
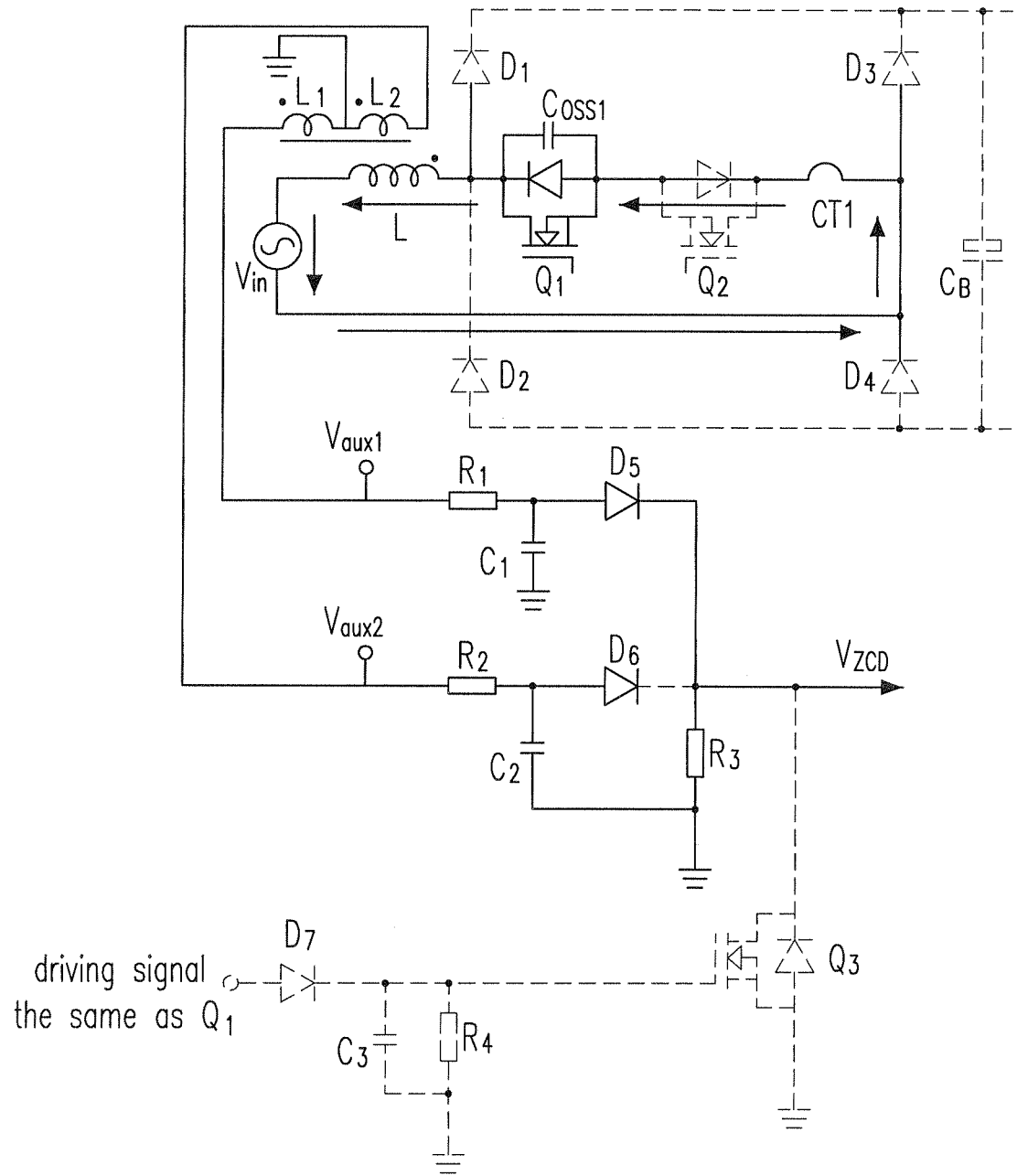

FIG. 12(c) shows the third stage of the circuit in FIG. 10, the corresponding waveforms are shown in the t2-t3 stage of FIG. 11. The rectifying diodes D1 and D4 are turned off naturally after the current of the inductor decreases to zero, and there is no generation of the reverse recovery current. The parasitic capacitor $C_{OSS1}$ of Q1 discharges and is resonant with the inductor L through Vin. At this stage, the sensed voltage Vaux2 of the auxiliary winding L2 is a negative voltage, and does not affect $V_{ZCD}$ due to the clamping of D6. The sensed voltage Vaux1 of the auxiliary winding L1 is resonantly decreased during the stage, and the amplitude of Vaux1 is a predetermined value at the end of that stage. The two voltage signals Vaux1 and Vaux2 are summed up on R3. Due to the existing of the measuring terminal capacitor, the measuring terminal voltage is still larger than the threshold Vth required by conducting the MOSFETs Q1 and Q2. And the duration of this stage is $$t_{M3} = \frac{\pi}{2}\sqrt{LC_{OSS}},$$

wherein $C_{OSS}$ is the capacitance of the parasitic capacitor $C_{OSS1}$.

Figure 12D:
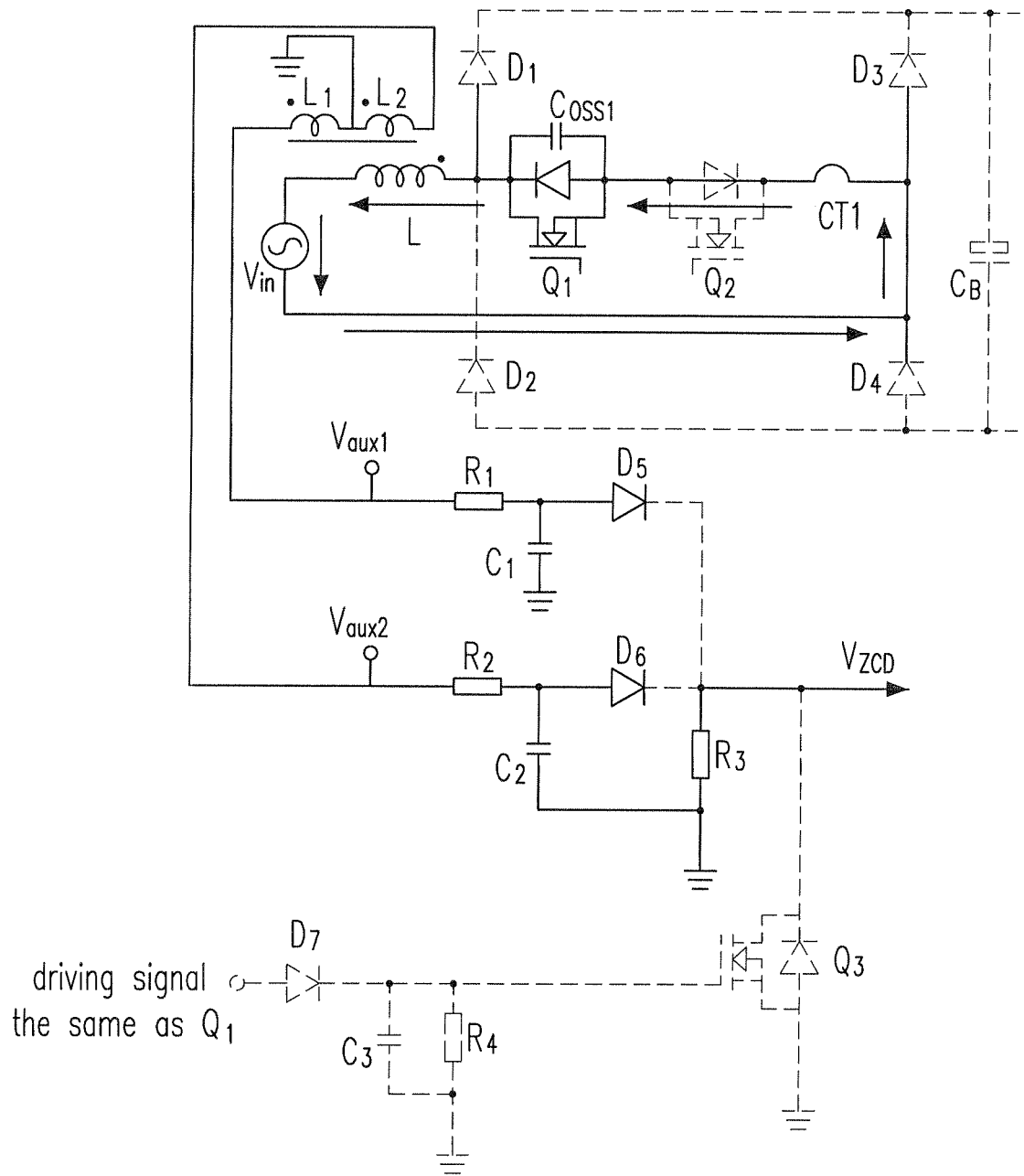

FIG. 12(d) shows the fourth stage of the circuit in FIG. 10, and the corresponding waveforms are shown in the t3-t4 stage of FIG. 11. The parasitic capacitor $C_{OSS1}$ of Q1 is resonant with the inductor L through Vin continuously. The current path is the same as the previous stage. The sensed voltage Vaux2 of the auxiliary winding L2 of the inductor L is zero, and the sensed voltage Vaux1 of the auxiliary winding L1 of the inductor L is resonantly decreased to a negative value. And at the end of the stage, the amplitude of Vaux1 is close to –n(Vin–$V_{S1}$–$V_{D1}$), wherein $V_{S1}$ is the source voltage of Q1, $V_{D1}$ is the drain voltage of Q1, and the voltage VDS1 (the voltage between the source and the drain of Q1) is close to zero. These two voltage signals are accumulated, and the voltage value is lower than the measuring threshold value required by conducting the MOSFETs Q1 and Q2 after a delay time of RC/2, the MOSFETs Q1 and Q2 are turned on, and the four stages of the positive half-cycle are ended. And the duration of this stage is, $$t_{M4} = \frac{\pi}{2}\sqrt{LC_{OSS}} = RC/2.$$

According to the aforementioned descriptions, the present invention provides a method for measuring an auxiliary winding of an inductor to realize the measurement of the zero-crossing of the inductor current so as to control the H-bridge to work under the critical CCM. This controlling method does not require to measure the inductor current, could obtain the signal of the zero-crossing of the inductor current irrelevant to the AC input voltage and the output load, and causes the MOSFETs to be turned on accurately, the switching on loss to be decreased, no reverse recovery loss of the boost rectifying diode, and the higher efficiency.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A bridgeless circuit, comprising:
   an AC power source having a first and a second terminals;
   a first and a second bridge arms, each of which has a first and a second terminals and a middle point, wherein the first terminal of the first bridge arm connects to the first terminal of the second bridge arm, the second terminal of the first bridge arm connects to the second terminal of the second bridge arm, and the middle point of the second bridge arm connects to the second terminal of the AC power source;
   a bidirectional switch module including a bidirectional switch having a first terminal connected to the middle point of the first bridge arm, and a second terminal connected to the middle point of the second bridge arm;
   an inductor having a first terminal connected to the first terminal of the AC power source and a second terminal connected to the middle point of the first bridge arm; and
   a first auxiliary winding magnetically coupled to the inductor for generating a sensing voltage so as to sense a zero crossing current of the inductor when the input voltage has a value being one selected from a group consisting of a positive value, a zero and a negative value.

2. A circuit according to claim 1, wherein the bidirectional switch comprises a first switch and a second switch connected to the first switch in series, each of the first and the second switches has a first and a second terminals, the first terminal of the first switch is connected to the middle point of the first bridge arm, the first terminal of the second switch is connected to the middle point of the second bridge arm, and the second terminal of the first switch is connected to the second terminal of the second switch.

3. A circuit according to claim 2 further comprising a second auxiliary winding, wherein the first auxiliary winding has a first and a second terminals generating a first sensing voltage on the first and the second terminals, and the second auxiliary winding is magnetically coupled to the inductor and has a first and a second terminals generating a second sensing voltage on the first and the second terminals of the second winding.

4. A circuit according to claim 3 further comprising a signal processing circuit generating an inductor current measuring signal through summing up the first and the second sensing voltages, wherein the inductor has an inductor current, and the inductor current measuring signal is a zero-crossing measuring signal of the inductor current and used to control the bidirectional switch module to turn on under zero current condition.

5. A circuit according to claim 4 further comprising an output capacitor having a first and a second terminals, wherein the first bridge arm has a first and a second diodes, the second bridge arm has a third and a fourth diodes, each of the diodes has an anode and a cathode, the cathode of the first diode connects the cathode of the third diode and the first terminal of the output capacitor, the anode of the first diode connects the cathode of the second diode to form the middle point of the first bridge arm, the anode of the third diode connects the cathode of the fourth diode to form the middle point of the second bridge arm, and the anode of the fourth diode connects the anode of the second diode and the second terminal of the output capacitor.

6. A circuit according to claim 4, wherein the bidirectional switch module receives a driving signal, the first and the second auxiliary windings have a second terminal; both of the second terminals of the first and the second auxiliary windings are grounded; the first auxiliary winding and the second auxiliary winding are reverse coupled with the inductor, and the signal processing circuit further comprises:
   a first resistor having a first terminal connected to the first terminal of the first auxiliary winding, and a second terminal;
   a second resistor having a first terminal connected to the first terminal of the second auxiliary winding, and a second terminal;
   a first capacitor having a first terminal connected to the second terminal of the first resistor, and a second terminal grounded;
   a second capacitor having a first terminal connected to the second terminal of the second resistor, and a second terminal grounded;
   a first diode having an anode connected to the first terminal of the first capacitor, and a cathode;
   a second diode having an anode connected to the first terminal of the second capacitor, and a cathode;
   a third resistor having a first terminal connected to the cathodes of the first and the second diodes and outputting the inductor current measuring signal, and a second terminal connected to the second terminal of the second capacitor;
   a third switch having a first terminal connected to the first terminal of the third resistor, a second terminal grounded and a control terminal; and
   a delaying circuit receiving the driving signal and outputting a delayed driving signal to the control terminal of the third switch.

7. A circuit according to claim 6, wherein the delaying circuit comprises:
   a fourth resistor having a first terminal coupled to the control terminal of the third switch, and a second terminal;
   a third capacitor having a first terminal coupled to the first terminal of the fourth resistor, and a second terminal coupled to the second terminal of the fourth resistor and grounded; and
   a third diode having an anode receiving the driving signal, and a cathode coupled to the first terminal of the third capacitor.

8. A circuit according to claim 4, wherein the bridgeless circuit is an H-bridge circuit, and the bidirectional switch module is turned on when the inductor current measuring signal has a predetermined value.

9. A circuit according to claim 4 further comprising a control circuit, comprising:
   an error amplifier receiving a reference voltage and an output voltage feedback signal generated by the bridgeless circuit, and generating a first output signal;
   a comparator receiving the first output signal and a ramp signal, and generating a second output signal; and
   a flip-flop having a first input terminal receiving the inductor current measuring signal, a second input terminal receiving the second output signal and an output terminal generating a driving signal driving the bidirectional switch module.

10. A circuit according to claim 9, wherein the flip-flop is an RS flip-flop.

11. A bridgeless circuit, comprising:
    an AC power source having a first and a second terminals;
    a first and a second bridge arms, each of which has a first and a second terminals and a middle point, wherein the first terminal of the first bridge arm connects to the first terminal of the second bridge arm, the second terminal of the first bridge arm connects to the second terminal of the second bridge arm, and the middle point of the second bridge arm connects to the second terminal of the AC power source;

a bidirectional switch module including a bidirectional switch having a first terminal connected to the middle point of the first bridge arm, and a second terminal connected to the middle point of the second bridge arm;

an inductor having a first terminal connected to the first terminal of the AC power source and a second terminal connected to the middle point of the first bridge arm;

a sensing circuit magnetically coupled to the inductor for generating a sensing voltage; and a signal processing circuit processing the sensing voltage and generating an inductor current measuring signal when the input voltage has a value being one selected from a group consisting of a positive value, a zero and a negative value so as to control the bidirectional switch module.

12. A circuit according to claim 11 wherein the inductor current measuring signal is a zero-crossing measuring signal of the inductor current.

13. A circuit according to claim 11 wherein the sensing circuit is an auxiliary winding coupled with the inductor for generating the sensing voltage.

14. A circuit according to claim 13 further comprising an output capacitor having a first and a second terminals, wherein the first bridge arm has a first and a second diodes, the second bridge arm has a third and a fourth diodes, each of the diodes has an anode and a cathode, the cathode of the first diode connects to the cathode of the third diode and the first terminal of the output capacitor, the anode of the first diode connects to the cathode of the second diode to form the middle point of the first bridge arm, the anode of the third diode connects to the cathode of the fourth diode to form the middle point of the second bridge arm, and the anode of the fourth diode connects to the anode of the second diode and the second terminal of the output capacitor.

15. A circuit according to claim 14, wherein the bidirectional switch comprises a first switch and a second switch connected to the first switch in series and receives a driving signal, each of the first and the second switches has a first and a second terminals, the first terminal of the first switch is connected to the middle point of the first bridge arm, the first terminal of the second switch is connected to the middle point of the second bridge arm, the second terminal of the first switch is connected to the second terminal of the second switch, the auxiliary winding has a first and a second terminals, the auxiliary winding is reverse coupled with the inductor, and the sensing circuit further comprises:

a first resistor having a first terminal connected to the first terminal of the auxiliary winding, and a second terminal;

a second resistor having a first terminal connected to the second terminal of the auxiliary winding, and a second terminal;

a fifth diode having an anode connected to the second terminal of the first resistor and a cathode;

a sixth diode having an anode connected to the second terminal of the second resistor and a cathode;

a third resistor having a first terminal connected to the cathodes of the fifth and the sixth diodes and outputting the inductor current measuring signal, and a second terminal;

a third switch having a first terminal connected to the anode of the sixth diode, a second terminal connected to the second terminal of the third resistor and a control terminal; and a fourth switch having a first terminal connected to the anode of the fifth diode, a second terminal connected to the second terminal of the third switch and the second terminal of the third resistor, and a control terminal.

16. A circuit according to claim 14 further comprising a control circuit, comprising:

an error amplifier receiving a reference voltage and an output voltage feedback signal generated by the bridgeless circuit, and generating a first output signal;

a comparator receiving the first output signal and a ramp signal, and generating a second output signal; and a flip-flop having a first input terminal receiving the inductor current measuring signal, a second input terminal receiving the second output signal and an output terminal generating a driving signal driving the bidirectional switch module.

17. A controlling method for a bridgeless circuit, wherein the circuit comprises an AC power source having a first and a second terminals, a first and a second bridge arms each of which has a first and a second terminals and a middle point, a bidirectional switch module including a bidirectional switch having a first terminal connected to the middle point of the first bridge arm, and a second terminal connected to the middle point of the second bridge arm, an inductor having a first terminal connected to the first terminal of the AC power source and a second terminal connected to the middle point of the first bridge arm, and a first and a second auxiliary windings coupled to the inductor, the first terminal of the first bridge arm connects the first terminal of the second bridge arm, and the second terminal of the first bridge arm connects the second terminal of the second bridge arm, comprising steps of:

causing the first auxiliary winding to generate a first sensing voltage;

causing the second auxiliary winding to generate a second sensing voltage;

using the first and the second sensing voltages to generate an inductor current measuring signal when the input voltage has a value being one selected from a group consisting of a positive value, a zero and a negative value; and turning on the bidirectional switch when the inductor current measuring signal reaches a predetermined value.

18. A controlling method for a bridgeless circuit, wherein the circuit comprises a bidirectional switch module, an inductor, and a first and a second auxiliary windings coupled to the inductor, comprising steps of:

causing the first auxiliary winding to generate a first sensing voltage;

causing the second auxiliary winding to generate a second sensing voltage;

using the first and the second sensing voltages to generate an inductor current measuring signal; and turning on the bidirectional switch module when the inductor current measuring signal reaches a predetermined value, wherein the first auxiliary winding has a first polarity reversed to a first polarity of the inductor, the second auxiliary winding has a first polarity reversed to the first polarity of the inductor and the bridgeless circuit is a bridgeless PFC circuit as claimed in claim 5.

19. A controlling method for a bridgeless circuit, wherein the circuit comprises an AC power source having a first and a second terminals, a first and a second bridge arms each of which has a first and a second terminals and a middle point, a bidirectional switch module including a bidirectional switch having a first terminal connected to the middle point of the first bridge arm, and a second terminal connected to the middle point of the second bridge arm, an inductor having a first terminal connected to the first terminal of the AC power source and a second terminal connected to the middle point of the first bridge arm, and an auxiliary winding coupled to the inductor, the first terminal of the first bridge arm connects to the first terminal of the second bridge arm, and the second terminal of the first bridge arm connects to the second terminal of the second bridge arm comprising steps of:
- causing the auxiliary winding to generate a sensing voltage;
- using the sensing voltage to generate an inductor current measuring signal when the input voltage has a value being one selected from a group consisting of a positive value, zero and a negative value; and
- turning on the bidirectional switch when the inductor current measuring signal has a predetermined value.

20. A controlling method for a bridgeless circuit, wherein the circuit comprises a bidirectional switch module, an inductor and an auxiliary winding coupled to the inductor, comprising steps of:
- causing the auxiliary winding to generate a sensing voltage;
- using the sensing voltage to generate an inductor current measuring signal; and
- turning on the bidirectional switch module when the inductor current measuring signal has a predetermined value,
- wherein the auxiliary winding has a first polarity reversed to a first polarity of the inductor, and the bridgeless circuit is a bridgeless PFC circuit as claimed in claim 11.

* * * * *